United States Patent [19]

Houston et al.

[11] 3,877,928

[45] Apr. 15, 1975

[54] LIQUID SOLUBLE PACKET

[76] Inventors: Walter A. Houston, P.O. Box 278, Mt. Prospect, Ill. 60068; Lynn K. Brunn, 701 Derchalt, Madison, Wis. 53711

[22] Filed: Oct. 12, 1970

[21] Appl. No.: 80,246

Related U.S. Application Data

[63] Continuation-in-part of Ser. No. 659,029, Aug. 8, 1967, abandoned.

[52] U.S. Cl. .................... 71/111; 71/79; 71/DIG. 1

[51] Int. Cl. .............................................. A01n 9/20

[58] Field of Search .................... 71/65, DIG. 1, 111

[56] References Cited
UNITED STATES PATENTS

| | | | |
|---|---|---|---|
| 2,750,027 | 6/1956 | Cummings | 206/.5 |
| 2,858,250 | 10/1958 | Geary | 71/DIG. 1 |
| 3,186,869 | 6/1965 | Friedman | 206/.5 |
| 3,316,676 | 5/1967 | Legal, Jr. et al. | 71/DIG. 1 |
| 3,342,581 | 9/1967 | Woodward et al. | 71/65 |
| 3,421,882 | 1/1969 | Ordas | 71/79 |
| 3,576,760 | 4/1971 | Gould et al. | 71/65 |
| 3,657,446 | 4/1972 | Blackmore | 71/65 |
| 3,737,551 | 6/1973 | Karsten et al. | 71/79 |
| 3,791,811 | 2/1974 | French et al. | 71/79 |

FOREIGN PATENTS OR APPLICATIONS

| | | | |
|---|---|---|---|
| 662,006 | 10/1965 | Belgium | 71/AD |

*Primary Examiner*—James O. Thomas, Jr.
*Attorney, Agent, or Firm*—John J. Byrne; Edward E. Dyson

[57] ABSTRACT

The invention concerns a water-soluble pesticide packet for submersion into water to form a liquid spray. Upon submersion, the polyvinyl-alcohol film encapsulating the pesticide dissolves, releasing the pesticide powder, dispersing agents, and wetting agents therein. To promote suspension of the insoluble pesticide particles in the liquid, relatively high concentrations of wetting and dispersing agents are encapsulated with the pesticide powder.

3 Claims, No Drawings

LIQUID SOLUBLE PACKET

This is a continuation-in-part of my co-pending application Ser. No. 659,029, filed Aug. 8, 1967, entitled: LIQUID SOLUBLE PACKET, now abandoned.

This invention generally relates to a liquid soluble pesticide packet and more particularly relates to a liquid soluble pesticide packet having improved dispersing characteristics so that upon immersion of the packet within a suitable liquid, a rapid and relatively even suspension of the pesticide particles is obtained without the necessity of slurry preparation or continuous agitation.

Various types of single portion packaged products are readily available to the consumer public. Pre-measured amounts of soap, detergents, dry bleaches, etc., are marketed in individual packets each of which contains sufficient ingredients for a single application or use. Many of the products so vended are somewhat toxic in that they contain substances which could be harmful or irritating should they be placed in intimate contact with the skin of the user. To provide a safe, more convenient package, such substances are often encapsulated in relatively small fin-type pouches constructed of water-soluble polyvinyl-alcohol film. The user need not open the packet, but merely immerse the capsule into water, thus dissolving the film and thereby releasing the contents so as to allow the ingredients to form a suspension in the water.

Pesticide products are considered to include insecticides, fungicides, miticides, herbicides, etc. Pesticide powders which include active as well as inert ingredients are abundantly used in the agricultural industry. They are mixed with water in loose powder form to form a suspension which is then sprayed upon the vegetation to obtain the desired results. In accordance with conventional practices, the pesticide powders are mixed, at the time of preparation of a pesticide solution, with small quantities of dispersin and wetting agents. Generally, the dispersing agent is by weight less than 5 per cent and the wetting agent by weight less than 2 per cent of the weight of the pesticide powder with which it is mixed. The user of such agricultural products immerses the powdered mixture into a small quantity of water to form a slurry. Additional water is added and the suspension is agitated to produce an even distribution of the insoluble particles in the liquid. During spraying, constant agitation of the liquid is necessary to maintain the particles in suspension.

Such preparations which are designed and formulated for the agricultural industry are generally unsatisfactory for use by the domestic gardener. Agricultural formulations are designed to meet the needs of farm sprayers which usually depend upon mechanical or by-pass agitators for initial slurry preparation and suspension maintenance during spraying. The use of such agricultural formulations by the domestic gardener requires slurry preparation, stirring, and constant shaking of the tank during spraying. This is an inconvenient procedure and is generally ignored. This omission results in poor brake-up of the compacted pesticide powder, uneven suspension, and rapid settling during use. The sprayed vegetation may thus become burned through excessive toxicant exposure or unsatisfactory results may be obtained by inadequate treatment. Occasionally, the spray nozzle becomes clogged as a result of high particle concentrations.

Such difficulties are particularly apparent when agricultural formulations are supplied to the domestic gardener in pre-measured, single-portion, water-soluble packets. When such pesticide packets are dropped into the spray tank, they do not go into or stay in suspension without the added step of either preparing an initial slurry or stirring the liquid and agitating the suspension without the added step of either preparing an initial slurry or stirring the liquid and agitating the suspension during spraying. Rather, the pesticide powder remains compacted at the bottom of the tank with the inner core frequently remaining dry. The preparatory and continued operations necessary to obtain uniform toxicant spray concentrations are generally ignored by the domestic user, resulting in poor and often damaging spray concentrations.

A main object of the present invention is to provide an improved liquid soluble pesticide packet suitable for use in the preparation of pesticide sprays. A further object is to provide a pesticide powder which will go into suspension in a liquid without the necessity of inconvenient preparatory steps. A still further object is to provide a liquid soluble pesticide packet having greatly improved wetting and dispersing qualities so as to provide a more uniform suspension of insoluble toxicant particles within the liquid over a considerable period of time.

Other objects and advantages of the invention will become apparent through reference to the following discussion which describes an illustrative embodiment of this invention.

A preferred embodiment of a liquid soluble pesticide packet including certain features of this invention comprises a conventional fin-type pouch constructed of polyvinyl-alcohol film approximately 1.5 mm in thickness. The cavity defined by the pouch is approximately 2½ cubic inches in volume. A particular characteristic of the film material is that it is water soluble. Upon immersion of the packet into water, the film dissolves so as to expose the powdered pesticide compound therein. Such polyvinyl-alcohol film pouches are relatively well-known in the art and are presently used for portion packaging of bleach, dyes, and other similar consumer products.

Disposed within the cavity defined by the packet is a quantity of water-insoluble pesticide powder. As previously mentioned, the term insoluble pesticide powder includes not only active insoluble ingredients, but also inert insoluble carrier particles which act as diluents and which are maintained in suspension with the active ingredients. The insoluble pesticide powder particles must be taken into and maintained in suspension during spraying. The present invention may be used with various pesticide powders such as insecticides, herbicides, miticides, fungicides, etc., which are well-known in the trade. Serving to aid in the formation of a suspension of the pesticide particles is a wetting agent in finely granulated form which is introduced into the cavity and mixed with the pesticide powder therein. Upon immersion in water, the wetting agent acts to lower the interfacial tension between the water and the pesticide particles so as to increase the tendency of the liquid to make complete contact with all faces of the insoluble particles.

It has been found that a relatively high concentration of wetting agent having a range of from 3.5 to 15 per cent of the weight of the insoluble particles comprising the pesticide powder provides the desired wetting action to facilitate satisfactory suspension of the particles in the liquid. One suitable wetting agent in this application is alkyl aryl polyether alcohol, commonly sold under the trademark TRITON X-100 by Rohm & Haas Company. The same wetting agent added to a carrier is marketed under TRITON X-120 and is the preferred agent for this invention.

Serving to reduce the cohesive attraction between particles so as to facilitate wetting and suspension of the insoluble pesticide particles, a finely granulated dispersing agent is introduced into the cavity of the pouch and mixed with the wetting agent and pesticide powder therein. A particular dispersing agent which has been found suitable in this application is lignosulfonate presently sold under the trademark MARASPERSE-N by the American Can Company. It has been found that a particularly desirable concentration of the dispersing agent is within the range of 5 per cent to 15 per cent of the weight of the insoluble particles of the pesticide powder.

Various water-soluble pesticide packets were constructed which were found particularly suitable for spraying, having the following ingredient formulations:

Tomato and Vegetable Spray

| Ingredients | Approx. Wt.% |
|---|---|
| Carbaryl (1-naphthyl N-methylcarbamate) | 22% |
| Maneb (manganese ethylene bisdithiocarbamate) | 19% |
| Lignosulfonate | 12% |
| Attaclay | 3% |
| Calcium Carbonate Diluent | 35% |
| Alkyl Aryl Polyether Alcohol | 5% |
| Other inert reaction impurities | 4% |
| | 100% |

Rose and Flower Spray

| Ingredients | Approx. Wt.% |
|---|---|
| Carbaryl (1-naphthyl N-methylcarbamate) | 14% |
| Malathion (O, O-dimethyl phosphorodithioate of diethyl mercaptosuccinate) | 9% |
| Dinitro (1-methylheptyl) phenyl crotonate | 1% |
| Folpet N ("trichloromethyl" thio) phthalimide | 14% |
| Alkyl Aryl Polyether Alcohol | 13% |
| Lignosulfonate | 6% |
| Inert Ingredients | 43% |
| | 100% |

Fruit Tree Spray

| Ingredients | Approx. Wt.% |
|---|---|
| Carbaryl (1-naphthyl N-methylcarbamate) | 15% |
| Captan N-("trichloromethyl" thio)-4-cyclohexine-1, 2-dicarboximide | 15% |
| Malathion (O, O-dimethyl phosphorodithioate of diethyl mercaptosuccinate) | 7% |
| Alkyl Aryl Polyether Alcohol | 7% |
| Lignosulfonate | 15% |
| Inert ingredients | 41% |
| | 100% |

Shrub and Evergreen Spray

| Ingredients | Approx. Wt.% |
|---|---|
| Carbaryl (1-naphthyl N-methylcarbamate) | 14% |
| Malathion (O, O-dimethyl phosphorodithioate of diethyl mercaptosuccinate) | 9% |
| Dinitro (1-methylheptyl) phenyl crotonate | 2% |
| Alkyl Aryl Polyether Alcohol | 10% |
| Lignosulfonate | 5% |
| Inert ingredients | 60% |
| | 100% |

Approximately 32 grams of each mixture was deposited into the cavity of a pouch constructed of polyvinyl-alcohol film of 1.5 mm thickness and sealed therein. Each packet was immersed within a gallon of tepid water and allowed to dissolve. The powder was agitated slightly to assure packet breakup, and the insoluble pesticide particles were taken into suspension, producing a pesticide spray. It was found that the pesticide particles were maintained in suspension over a relatively long period of time without the necessity of constant agitation of the liquid. Thus, an improved liquid soluble pesticide packet has been described particularly adapted for domestic use which provides the user with a convenient means of obtaining a liquid spray.

It is important to note that with some pesticides the speed and duration of suspension is maximized if the wetting agent exceeds the dispersing agent in percentage by weight of the insoluble particles of the pesticides powder and vice versa, though both are maintained at relatively high levels relative to conventional compounds. In the above examples, please note that in the rose and flower spray and the shrub and evergreen spray, the wetting agents exceed the amount of dispersing agent in the mixture. While in the fruit tree spray and the tomato and vegetable spray the amount of dispersing agent exceeds the amount of wetting agent.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

We claim:

1. A method of forming a single portion pesticide packet having a sealed pouch defining a cavity therein, comprising the steps of constructing said pouch of a relatively thin water soluble film, depositing into the cavity defined by said pouch a predetermined quantity of a water-insoluble pesticide composition consisting essentially of a pesticide powder including insoluble particles, a powdered dispersing agent in an amount of between 5 per cent to 15 per cent of the weight of said insoluble pesticide particles, and a powdered wetting agent in an amount of between 3.5 per cent to 15 per cent of the weight of said insoluble pesticide so that upon immersion of said pouch into a water, the contents therein will be released readily forming and maintaining a lengthy suspension within the liquid without the necessity of slurry preparation or continued agitation.

2. The method of claim 1 wherein said dispersing agent is lignosulfonate and said wetting agent is alkyl aryl polyether alcohol.

3. The packet of claim 1, wherein said dispersing agent is lignosulfate and said wetting agent is an alkyl aryl polyether alcohol.

* * * * *